UNITED STATES PATENT OFFICE.

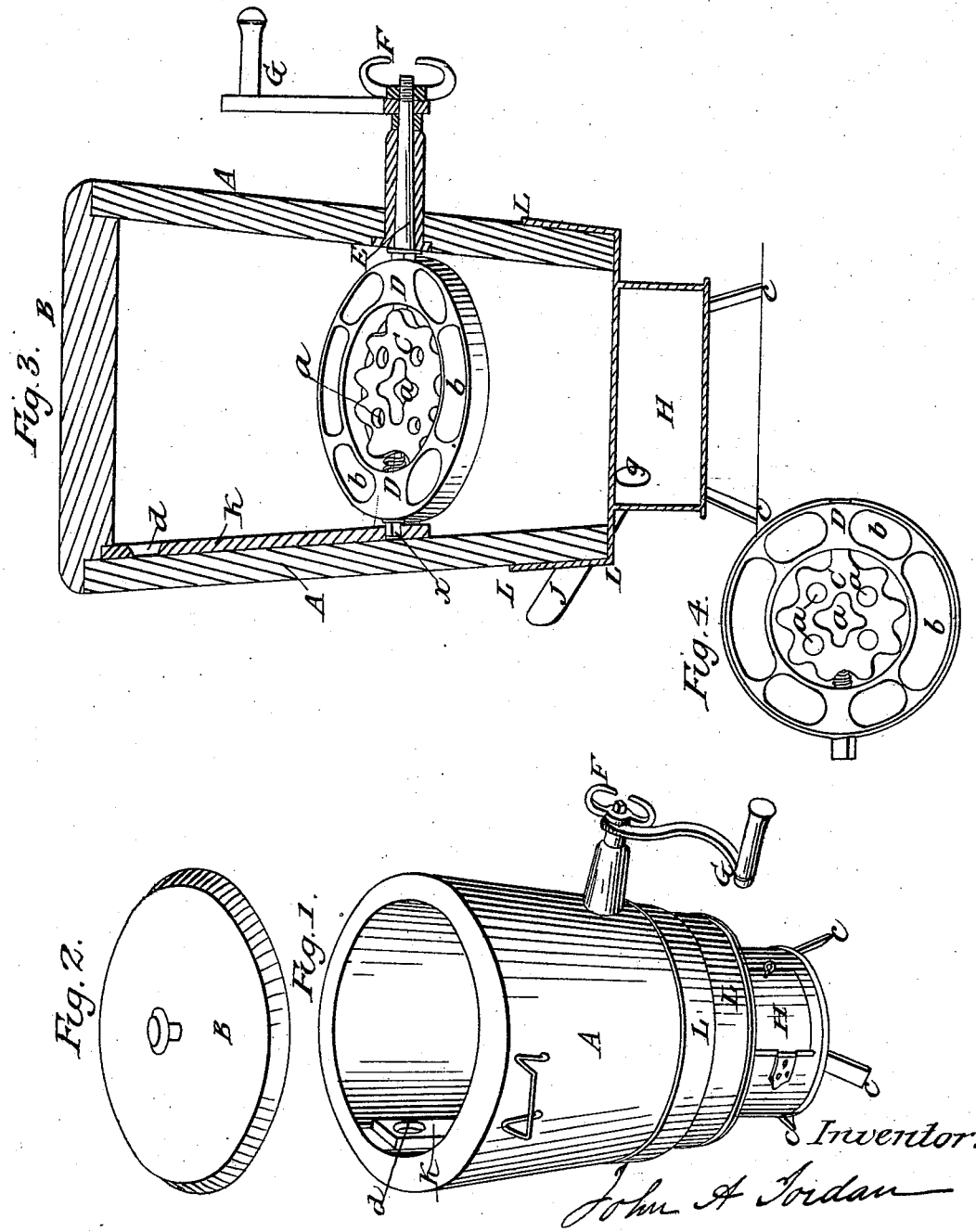

JNO. A. JORDAN, OF SHELBYVILLE, TENNESSEE.

CHURN.

Specification of Letters Patent No. 19,782, dated March 30, 1858.

*To all whom it may concern:*

Be it known that I, JOHN A. JORDAN, of Shelbyville, in the county of Bedford and State of Tennessee, have invented a new and useful Improvement in Churns; and I do hereby declare that the following is a full and exact description thereof.

The nature of my invention consists of a frame or churn body, having therein a revolving and a stationary wheel with gearing arrangement, and the bottom of the churn constituting at the same time the top of a stove, said stove being used for warming the cream.

To enable others skilled in the art to make and use my invention I will proceed to describe its construction and operation, reference being had to the accompanying drawings and to the letters of reference marked thereon.

Figure 1 is an outside view of the churn and shows the churn, the stove, the crank by which the wheel within is made to revolve, the thumb clamp, and the gearing bar. Fig. 2 is the top of the churn. Fig. 3 is a sectional view, showing the stationary and revolving wheel and their arrangement, and also the pipe for the escape of smoke from the stove. Fig. 4 shows the stationary and revolving whels.

The inner wheel is corrugated on its circumference and is held stationary by a pin x, Fig. 3, which passes through the revolving or outer wheel, one end resting in an aperture in the gearing bar and the other fastened by a screw into the edge of the inner wheel. This inner corrugated wheel is marked C in Figs. 3 and 4. The wheel C is fastened and held in place near the crank side by a projection from the wheel resting against and pressing upon or being pressed by the inner end of the crank E, Fig. 3. On the inside of the bearing the crank is square sided, so that fitting into a like aperture in the stationary wheel C, Figs. 3 and 4, the outer wheel D, Figs. 3 and 4, is made to revolve by motion of the crank either backward or forward at will. The inner wheel C, Figs. 3 and 4, has circular or other orifices through it admitting of the passage of the liquid or cream which is being agitated by the larger and outer wheel D, Figs. 3 and 4, in its revolutions. This larger wheel or dasher D, Figs. 3 and 4, has indentations b b, Figs. 3 and 4, of various shapes on both surfaces, by which the air is carried down and under the surface of the cream and into which the particles of butter are collected as soon as formed. The close box bearing of the crank E and the bearing of the dasher and the stationary wheel at the opposite point being upon the gearing bar K, Figs. 1 and 3, the churn is thus water tight. The adjustment of these wheels C and D, is made rapidly or the wheels are removed entirely when required by pulling out the gearing bar K, Figs. 1 and 3, which works in a slot on the inner surface of the churn. The body of the churn is placed within a metallic casing L, Fig. 1, fitting its bottom and lower end. This casing L, Fig. 1, also forms the top to a stove H, Figs. 1 and 3, upon which the whole rests, c c c representing the feet of said stove, and I, Fig. 3, the pipe to carry off the smoke.

The cream having been placed in the churn, heat is communicated to it through or by means of the stove, and at the same time power is applied to G, Fig. 3, the handle of the crank, and this gives motion to the wheel D, Figs. 3 and 4, or dasher. The motion naturally given to the cream by this action brings it in contact with the stationary wheel C, Figs. 3 and 4, over and through the orifices of which it passes and is broken, again to be moved by the dasher. In this manner butter is formed in an incredibly short space of time and all the butter contained by the cream is collected, and the buttermilk remains, and both are ready for use.

What I claim as my invention and desire to secure by Letters Patent is—

The employment of the revolving wheel D and stationary wheel C constructed and operating in the churn as set forth, the bottom of the same being fitted to a stove casing in the manner and for the purposes specified.

JOHN A. JORDAN.

Witnesses:
GEO. L. THOMAS,
BENJ. LITTLE.